July 9, 1940.  J. F. O'KEEFE  2,207,410
DEVICE FOR LAYING COURSES AND THE LIKE
Filed March 29, 1939  2 Sheets-Sheet 1
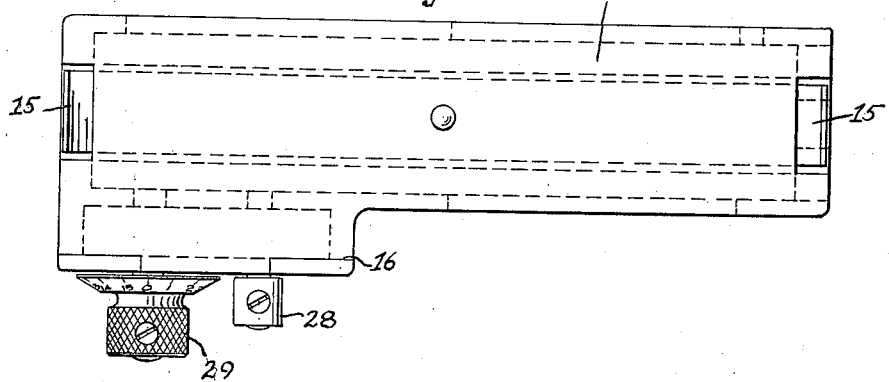
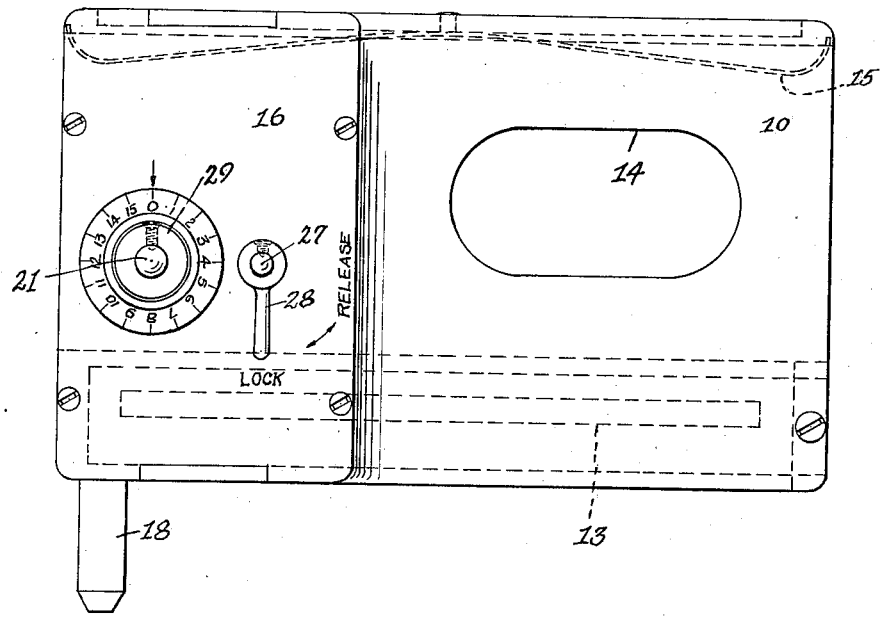
INVENTOR.
Joseph F. O'Keefe.
BY
ATTORNEY.

July 9, 1940. J. F. O'KEEFE 2,207,410
DEVICE FOR LAYING COURSES AND THE LIKE
Filed March 29, 1939 2 Sheets-Sheet 2
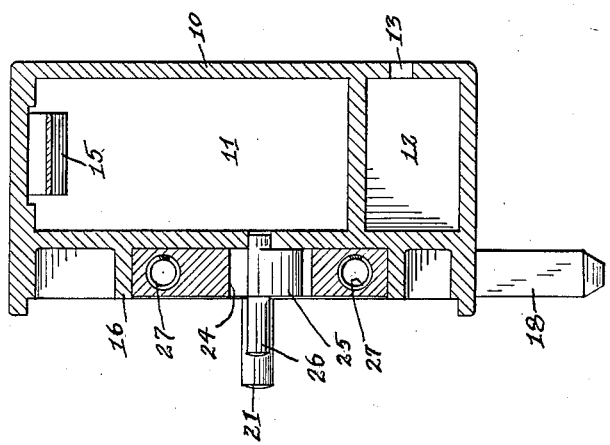
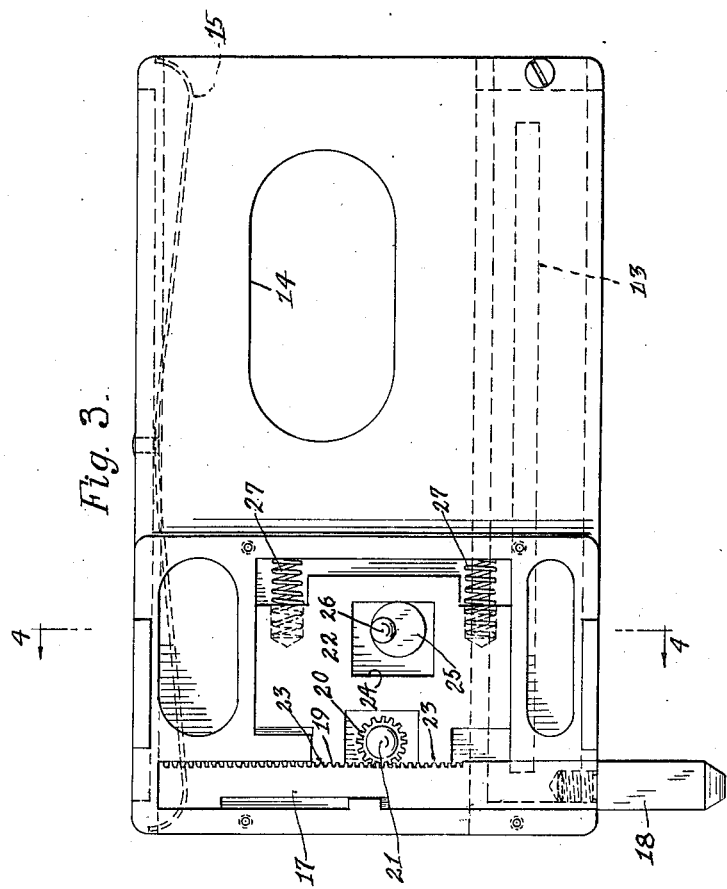
INVENTOR.
Joseph F. O'Keefe.
BY
Robert J. Hulsizer
ATTORNEY.

Patented July 9, 1940

2,207,410

UNITED STATES PATENT OFFICE 2,207,410

DEVICE FOR LAYING COURSES AND THE LIKE

Joseph F. O'Keefe, West New York, N. J.

Application March 29, 1939, Serial No. 264,700

4 Claims. (Cl. 33—207)

This device relates to simple and efficient means whereby a level can be more quickly and easily employed to lay and determine courses of different series of elements such as bricks and mortar, and tiles and cement and many other combinations of elements and materials which are to be laid with respect to each other under necessary and desired dimensional requirements.

A main object is to provide a simple and efficient device whereby courses comprising a series of superposed elements or materials can be quickly and easily laid to definite dimensional limits merely by using a level and my simple device with which it is employed.

Further and more specific objects, features, and advantages will more clearly appear when considered in the light of the specification and especially when taken in connection with the accompanying drawings which form part of the specification and which illustrate a present preferred form which the invention may assume.

Briefly the invention comprises a casing to receive and house a portion of a level which is kept in definite relation to one surface of the casing in combination with a guage member extending at an angle to the line of the level and settable with ease so that the end of the guage is at predetermined distance from the bottom of the level, distances which can be easily read from a dail on the casing which dial is moved to set the guage.

The present preferred form which the invention assumes is shown in the drawings of which Fig. 1 is a plan view of the device;

Fig. 2 is a front elevation of the device;

Fig. 3 is a front elevation of the device with the front plate removed to show the operating parts; and, Fig. 4 is a cross section taken on the line 4—4 of Fig. 3.

Since this device is to be used with levels which workmen use in many lines of construction such as carpentering, concrete work, cement work, brick-laying and the like, it preferably comprises a relatively long, tall, and narrow casing 10 adapted to rather snugly house a level in a chamber 11 which runs entirely through the length of the casing. Beneath the main chamber 11 there is a secondary smaller chamber 12 in which may be disposed in any suitable manner a chart or similar device having thereon data or other figures which can be viewed through a long narrow view slot 13 so as to enable the workman to perform desired calculations in connection with whatever work he may be doing. A knob or other means (not shown) may be provided and connected to the chart to enable it to be turned or manipulated to expose different parts thereof to view.

The main portion of the casing 10 is provided with oppositely disposed view windows such as 14 through which the workman can observe the position of the bubble on the level which is housed in the casing with at least one end extending therefrom preferably to the right as viewed in Fig. 2. A spring 15 is disposed along the top wall of the chamber 11 to bear down on the top of the level to hold its bottom edge firmly along and against the bottom wall of the chamber 11.

As seen in Fig. 1, there is attached to the main casing 10 at the left front portion thereof a secondary offset casing 16 which I call the operating casing because it houses certain operating parts. In the casing portion 16 there is disposed a rack member 17 the lower portion of which extends down through an opening therein and has on its lower end a guage member 18 which is detachably connected thereto as by screw threads. The length of the guage 18 is of a predetermined amount and various guages of different desired lengths may be attached to the lower end of the rack member 17 as the conditions of the work require. The rear face of the rack 17 is provided with teeth 19 with which a pinion 20 meshes. Said pinion is mounted on a shaft 21 extending forwardly through the casing 16 and having on its outer end a dial knob 29 upon which are formed suitable numbered graduations.

In order to lock the rack in any desired position of movement there is housed within the casing 16 a latch plate 22 having laterally extending toothed tongues 23 adapted to be moved into locking engagement with the teeth on the rack 17. This lock plate is provided with an opening 24 in which is disposed an operating cam 25 mounted on a shaft 26 extending through the front of the casing 16 and having on this end an operating handle 28. Springs 27 in the casing 16 are housed at one end in holes in the rear face of the lock plate 22 and tend to press the plate forward against the teeth of the rack bar 17. The cam as shown in Fig. 3 can be turned to force the lock plate 22 back against the action of the springs 27 so as to disengage the teeth of the lock plate 22 from the teeth of the rack bar 17 and allow the rack bar 17 to be adjusted to some new desired other position by turning the knob 29.

In the operation of the device let us assume that we are using it to lay courses of bricks and that the bricks are of a depth of an inch and a half and that it is desired to lay mortar between the course of a depth of a sixteenth of an inch. In that case we would insert a guage member of such size that the distance between the bottom of the chamber 11 and the bottom of the guage would be just an inch and a half or equal to the depth of the brick to be laid. The graduations on the knob are such that when moving from one to the next the guage is raised or lowered just one sixteenth of an inch. It is of course understood that by changing the graduations the distance moved by the guage for a movement of one graduation can be varied as desired.

In laying a new course of brick on top of one already laid it is only necessary to lay a new brick on top of the old course and then place the extending end of the level on this brick and notice the position of the bubble. Since it will be off true at first the next thing to do is to set the knob 29 to graduation No. 1 which will lower the end of the guage one sixteenth of an inch equivalent to the amount of depth of mortar desired to be interposed between the bricks. Then mortar is placed between the new brick and the old course and the level again laid thereon with the guage resting on the adjacent top of the old course. It will be seen that when the bubble reads true level then the thickness of the mortar must be just the desired amount and we then proceed to the laying of the next brick at which time the operation may be repeated. If thicker layers of mortar are to be laid then the guage need only be lowered the desired amount to provide an accurate and quick means whereby to know just when that amount of mortar has been interposed. Of course after the first brick is laid with this device it is not absolutely necessary to use this device for the rest of the bricks of that course since the level itself guaged from the first brick will furnish the standard level position for all the rest. It is clear then that with any guage in place and with the scale set at zero the distance from the bottom of the chamber 11 to the bottom of the guage will represent in this example the depth of the brick to be used. Of course in other problems it may represent any other definite predetermined dimension and the additional depth required is guaged from and by the movement of the scale from the zero position.

It will therefore be seen that I have provided a simple and efficient device whereby the laying of course of different members may be quickly and easily achieved especially where courses are to be laid of a plurality of members such as bricks or tiles and mortar or other intervening elements. With the dimensions of one series of members fixed such as the bricks it is easy to pick the requisite guage and then the thickness or depth of the remaining elements in the series can be calculated and the guage set by lowering it to the proper extent.

While the invention has been described in detail and with respect to a preferred present form thereof, it is not to be limited to details and forms since many changes and modifications may be made in the invention without departing from the spirit and scope of the invention in its broadest aspects. Hence it is desired to cover any and all forms and modifications of the invention which may come within the language or scope of any one or more of the appended claims.

What I claim, is:

1. In combination a casing having a chamber to receive and house a portion of a level, spring means engaging the level and pressing it against the bottom surface of the chamber, a guage member on the casing and movable in a given direction with respect to the axis of the level and having a normal position with its end a predetermined distance from the bottom of the level, and means connected to the guage member to move it to other predetermined off-normal positions.

2. In combination a casing having a chamber to receive and house a portion of a level, means engaging the level and pressing it against the bottom of the chamber, a movable member on the casing adapted to move in a direction at right angle to the length of the level, a guage element detachably connected to the lower end of said movable member, said guage member when the movable member is in normal position to extend a predetermined distance below the lower edge of the level, and means on the casing to move the movable member to move the guage to other positions with respect to the lower edge of the level.

3. In combination a casing having a chamber to receive and house at least one end of a level with the other end of the level extending therefrom, means to dispose the bottom edge of the level against the bottom of the chamber, a rack bar on the casing disposed at right angles to the length of the level, a guage element detachably mounted on the lower end of the rack bar, said guage element being of predetermined length, an operating pinion engageable with the rack bar and rotatable to lower and raise the bar, a lock plate having means to engage and lock the bar, and means to move the lock plate away to disengage the rack bar, and other means tending to force the lock plate into engagement with the rack bar.

4. In combination a casing having a chamber to receive and house at least one end of a level with the other end of the level extending therefrom, means resiliently engaging the level to hold its bottom edge against the bottom of the chamber, a rack bar on the casing disposed at right angles to the length of the level, a guage element detachably mounted on the lower end of the rack bar, said guage element being of predetermined length, an operating pinion engageable with the rack bar and rotatable to lower and raise the bar, a graduated dial connected to said pinion to enable the predetermined setting of the guage, a lock plate having teeth to engage and lock the rack bar, spring elements engaging the lock plate to force it toward the rack bar, a cam to engage the lock plate to move it away from the rack bar against the action of the springs, and a handle on the cam to be manipulated to move the same.

JOSEPH F. O'KEEFE.